O. W. HART.
ROLLER BEARING.
APPLICATION FILED JUNE 18, 1917.

1,262,338.

Patented Apr. 9, 1918.

INVENTOR
Orlando W. Hart.
by William A. Hardy.
HIS ATTY.

UNITED STATES PATENT OFFICE.

ORLANDO W. HART, OF FALL RIVER, MASSACHUSETTS.

ROLLER-BEARING.

1,262,338.  Specification of Letters Patent.  Patented Apr. 9, 1918.

Application filed June 18, 1917. Serial No. 175,365.

*To all whom it may concern:*

Be it known that I, ORLANDO W. HART, a citizen of the United States, and a resident of Fall River, Bristol county, Massachusetts, have invented certain new and useful Improvements in Roller-Bearings, of which the following is a description.

My invention relates to roller bearings and more particularly to that type of roller bearings described and claimed in Patent #1,205,449 granted to me on November 21, 1916.

One of the objects of my invention is to provide an improved construction and arrangement for facilitating the assembly of the parts of a roller bearing, especially a roller bearing of the type disclosed in my above mentioned patent, in operative position, my invention being particularly adapted to enable a roller bearing comprising many parts to be readily assembled in difficult positions, as for example:—about a portion of a shaft where it is difficult or impossible to apply the bearing from either end of the shaft, as in the case of crankshafts or transmission shafting.

Another object of my invention is a simple and efficient provision for preventing the relative displacement of the parts of a roller bearing when in assembled position.

My invention also contemplates a construction and arrangement for attaining the above objects which will in no way interfere with the normal operation of the bearing and the use of which is accompanied with a minimum of wear and friction.

Other objects of my invention reside in the construction of parts and combinations of elements hereinafter more fully described and claimed.

For a clearer understanding of my invention, attention is directed to the drawing accompanying and forming a part of this specification, in the several views of which corresponding parts are designated by the same reference characters, and in which.

Figure 1:
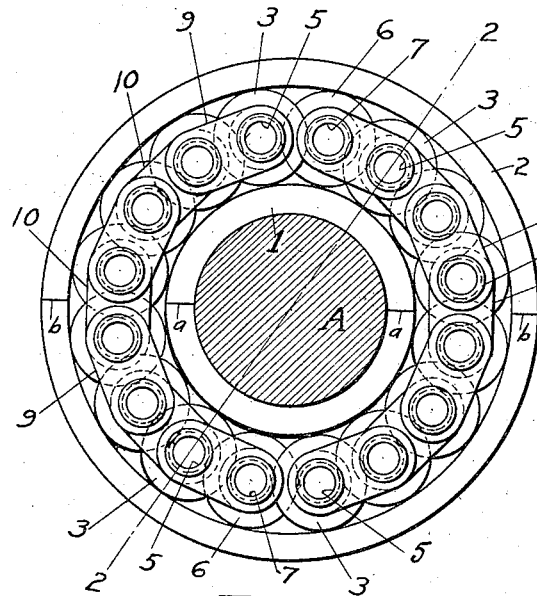
Figure 1 is a view in end elevation of a roller bearing embodying my invention applied to a shaft, the shaft being shown in section.

Referring to the drawing, reference character A represents a shaft having rigidly secured thereto, in any suitable manner, a hardened cylindrical sleeve or inner bearing member 1. The sleeve 1 may be and preferably is split, as at $a$, into two sections so as to enable the same to be easily applied to a portion of a shaft which is not readily accessible from the ends thereof. Reference character 2 represents an outer hardened cylindrical sleeve or bearing member, which is spaced from the sleeve 1 and is also preferably split, as at $b$, into two sections.

A plurality of annular series of rolls, three series B, C and D being shown, are disposed between the inner and outer bearing members 1 and 2 which form runways therefor. The corresponding pairs of rolls 3 and 4 of the alternate series of the bearing, that is the two outside series B and D in the bearing shown, are respectively loosely mounted on hollow alining shafts 5, while the rolls 6 of the intermediate series C are respectively loosely mounted on hollow alining shafts 7. The shafts 5 and 7 are parallel to the axis of the bearing, and, for a purpose hereinafter described, are preferably somewhat longer than the combined width of series C, B and D. The rolls and alining shafts of each series respectively coact with the alining shafts and rolls of every adjacent series, when the bearing is assembled, to maintain the rolls of adjacent series staggered in the manner described in Patent #1,205,449 referred to above. The alining shafts 5 and 7 are preferably provided with perforations 8 whereby in the rotation of the rolls about the alining shafts and in the rotation of the series of rolls about the axis of the bearing, lubricant supplied to the bearing will be thoroughly circulated through the bearing and distributed to all parts thereof.

Figure 2:
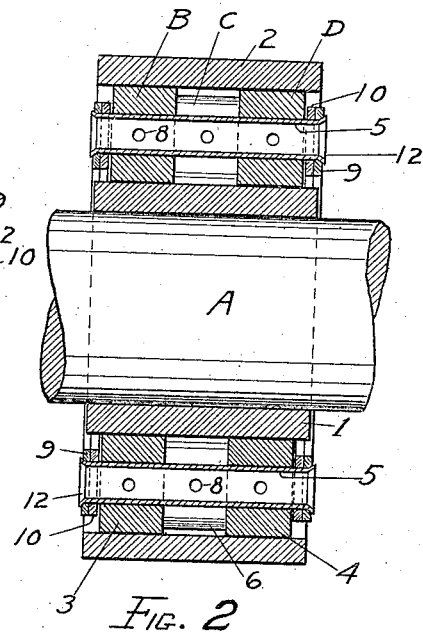
Fig. 2 is a sectional view taken on line 2—2 of Fig. 1, the shaft being shown in elevation.

The rolls and alining shafts of the series B, C and D of the bearing are connected together, preferably in two sections, in chain relation so that when such series are removed from the bearing members 1 and 2, the rolls and shafts of each section will be maintained in proper relative position. This enables the bearing to be readily assembled, as shown in Figs. 1 and 2, about a portion of a shaft which is inaccessible from the ends of the shaft. The shafts 5 and 7 are of such length as to extend beyond the end roll surfaces of the bearing, and the extending end portions of the adjacent pairs of alining shafts 5 and 7 of each chain section of the series B, C and D have the outer and inner links 9 and 10 loosely mounted thereon in alternate arrangement, by means of which the rolls and alining shafts of the section are connected in chain relation. The extending end portions of each alining shaft at the ends of each section of rolls and shafts connected in chain relation, have rings 11 respectively loosely mounted thereon between the outer end links 9 and the adjacent end roll surfaces to maintain said links in proper spaced relation to such roll surfaces. The ends of the hollow alining shafts 5 and 7 are enlarged, preferably by expanding the same as shown at 12, to thereby maintain links 9 and 10 and rings 11 in proper position and prevent them from slipping off the shafts. The enlarged or expanded ends 12 of the shafts 5 and 7 also serve to prevent any substantial longitudinal movement of shafts 5 and 7 relative to the rolls mounted thereon and thus serve to maintain members 3, 4, 5, 6 and 7 in proper position in the operation of the bearing. This feature may, of course, be employed in a bearing where the rolls and shafts are not connected in chain relation. The openings in the outer links 9 through which the shafts 5 and 7 extend preferably have the outer portions of their walls flared to provide seats 13 for and conforming to the flared or expanded ends 12 of these shafts.

Figure 3:
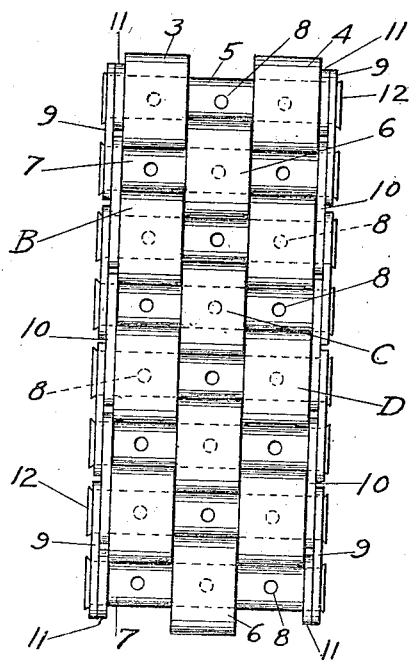
Fig. 3 is a view in elevation of one of the sections of the roller assembly shown in Fig. 1 extended in a straight line and showing how the parts comprising such section are held in proper relative position.
Figure 4:
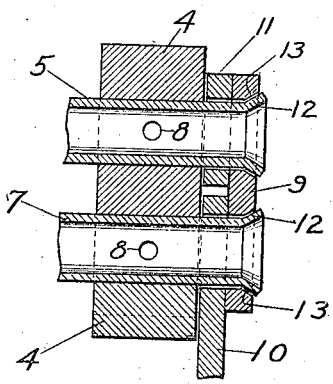
Fig. 4 is an enlarged fragmental sectional view taken through the right hand end portions of the upper two roll shafts of Fig. 3.

Links 9 and 10 and rings 11 preferably fit very loosely on the extending end portions of shafts 5 and 7 as they have nothing whatever to do with maintaining the rolls and alining shafts in proper position when the bearing is completely assembled as shown in Figs. 1 and 2 and may be said to float on the extending end portions of the shafts. Their principal function is to maintain the rolls and alining shafts in proper relative position for assembly in the bearing when the same are removed from bearing members or sleeves 1 and 2. This is illustrated in Fig. 3, which shows one of the chain sections of the rolls and shafts removed from the bearing and straightened out.

It will be obvious that with sections of the rolls and alining shafts linked together in chain relation, as shown, and with the split sleeves or bearing members 1 and 2, the bearing may be quickly and readily assembled in positions where it would be impossible or difficult to apply the bearing as an assembled unit.

It is to be understood, of course, that the construction shown and described herein is subject to many changes in the size and shape and arrangement of parts without any departure from the spirit of the invention and the scope of the appended claims.

Having now described my invention, what I claim and desire to protect by Letters Patent is as follows:

1. In a roller bearing, a series of rolls, shafts on which said rolls are respectively mounted, and links connecting adjacent shafts, said rolls, when the bearing is assembled, being maintained in proper spaced relation independently of any action of said links.

2. In a roller bearing, a series of rolls, shafts on which said rolls are respectively mounted, and links applied to said shafts in floating relation thereto and adapted to hold the said rolls in chain relation when the latter are removed from the bearing, said rolls, when the bearing is assembled, being maintained in proper spaced relation independently of any action of said links.

3. In a roller bearing, a plurality of annular series of rolls, the rolls of adjacent series being in staggered relation, and shafts on which the corresponding rolls of alternate series are respectively rotatably mounted, said shafts extending beyond the outer or end roll surfaces of the bearing and having enlarged ends.

4. In a roller bearing, a plurality of annular series of rolls, and hollow shafts on which the corresponding rolls of alternate series are respectively rotatably mounted, the rolls and shafts of each series coacting respectively with the shafts and rolls of adjacent series to maintain the rolls in adjacent series in staggered relation, the ends of said shafts extending beyond the outer or end roll surfaces of the bearing and being expanded.

5. In a roller bearing, a plurality of annular series of rolls, the rolls of adjacent series being in staggered relation, hollow shafts on which the corresponding rolls of alternate series are respectively rotatably mounted, said shafts extending beyond the outer or end roll surfaces of the bearing, and links respectively loosely mounted on the extending end portions of each pair of adjacent shafts adapted to hold the shafts in proper relative position, the ends of said shafts being expanded and serving to hold said links in position.

6. In a roller bearing, a plurality of rolls, hollow shafts on which said rolls are respectively rotatably mounted and having end portions extending beyond said rolls, and links respectively mounted on and connecting the projecting end portions of adjacent pairs of shafts, the ends of said shafts being expanded, and the links nearest the ends of the shafts being provided with seats conforming to said expanded ends.

7. In a roller bearing, a series of rolls, hollow shafts on which said rolls are respectively rotatably mounted and the end portions of which extend beyond the rolls, and means for connecting said shafts and rolls in chain relation comprising alternately arranged outer and inner apertured links, the extending end portions of said shafts projecting through the apertures in said links, the ends of said shafts being expanded, and the walls of the apertures in the outer links being formed to provide seats conforming to said expanded ends.

This specification signed and witnessed this 12th day of June, 1917.

ORLANDO W. HART.

Witnesses:
STANLEY L. GEDNEY, Jr.,
VIOLA E. WILHELM.